US012602232B2

(12) United States Patent
Vinod

(10) Patent No.: US 12,602,232 B2
(45) Date of Patent: Apr. 14, 2026

(54) METHODS AND SYSTEMS FOR CONTEXTUAL APPLICATION ACTION(S) BASED ON PREVIOUS CONTEXT OF ANOTHER APPLICATION

(71) Applicant: Babu Vinod, Palo Alto, CA (US)

(72) Inventor: Babu Vinod, Palo Alto, CA (US)

( * ) Notice: Subject to any disclaimer, the term of this patent is extended or adjusted under 35 U.S.C. 154(b) by 0 days.

(21) Appl. No.: 18/123,323

(22) Filed: Mar. 19, 2023

(65) Prior Publication Data

US 2024/0086204 A1      Mar. 14, 2024

Related U.S. Application Data

(60) Provisional application No. 63/321,664, filed on Mar. 19, 2022.

(51) Int. Cl.
*G06F 9/44* (2018.01)
(52) U.S. Cl.
CPC ..................................... *G06F 9/44* (2013.01)

(58) Field of Classification Search
None
See application file for complete search history.

(56) References Cited

U.S. PATENT DOCUMENTS

| | | | | |
|---|---|---|---|---|
| 9,652,797 | B2 * | 5/2017 | Vijayaraghavan | .... G06F 16/951 |
| 11,556,808 | B1 * | 1/2023 | Kim | ...................... H04L 67/535 |
| 2019/0384657 | A1 * | 12/2019 | Chen | ....................... G06F 9/451 |
| 2022/0374110 | A1 * | 11/2022 | Ramaswamy | ...... G06F 3/04883 |
| 2023/0195819 | A1 * | 6/2023 | Shalaby | .............. G06F 11/3438 |
| | | | | 706/12 |
| 2023/0288990 | A1 * | 9/2023 | Prasad | ................ G06F 3/04886 |
| 2024/0095805 | A1 * | 3/2024 | Sztyler | ................ G06F 16/9024 |

* cited by examiner

*Primary Examiner* — Fahmida Rahman

(57) ABSTRACT

In one aspect, for each open application, obtain a current application state and an application content; determine one or more relationships between the application state and the application content; use the one or more relationships between the application state and the application content to determine a user intent; for a currently used application, determine a match between an application function and the user intent; and suggest an automatic action for the application function based on the match between an application function and the user intent.

5 Claims, 3 Drawing Sheets

FOR EACH OPEN APPLICATION, OBTAIN A CURRENT APPLICATION STATE AND CONTENT
202

DETERMINE ONE OR MORE RELATIONSHIPS BETWEEN THE APPLICATION STATES AND CONTENTS TO DETERMINE A USER INTENT
204

FOR A CURRENTLY USED APPLICATION, DETERMINE A MATCH BETWEEN AN APPLICATION FUNCTION AND A USER INTENT
206

SUGGEST AND/OR PERFORM AND AUTOMATIC ACTION FOR THE APPLICATION FUNCTION BASED ON THE MATCH OF STEP206
208

200

APPLICATION SOFTWARE

APPLICATION A
102 A

APPLICATION B
102 B

APPLICATION C
102 C

APPLICATION CONTEXT UNIFIER
114

APPLICATION PROCESSOR/ GPU
104

OPERATING SYSTEM
106

MAIN MEMORY (E.G. DRAM)
108

GPS DISPLAY/TS KBD/ CAMERA/MPHONE/ SPEAKER/ ETC.
110

TRANSCEIVER/RECEIVER/ ANTENNA(S)/MODEM(S)/ ETC.
112

100

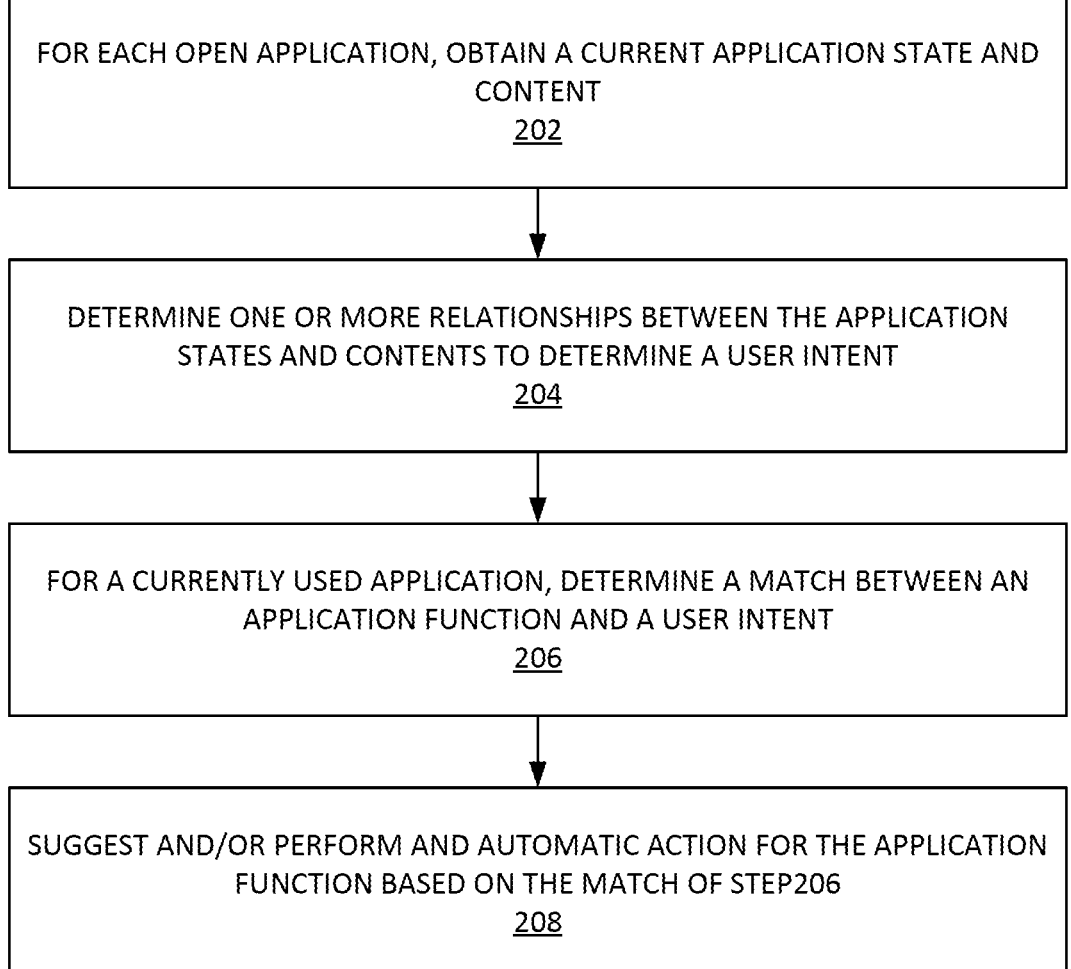

FOR EACH OPEN APPLICATION, OBTAIN A CURRENT APPLICATION STATE AND CONTENT
202

DETERMINE ONE OR MORE RELATIONSHIPS BETWEEN THE APPLICATION STATES AND CONTENTS TO DETERMINE A USER INTENT
204

FOR A CURRENTLY USED APPLICATION, DETERMINE A MATCH BETWEEN AN APPLICATION FUNCTION AND A USER INTENT
206

SUGGEST AND/OR PERFORM AND AUTOMATIC ACTION FOR THE APPLICATION FUNCTION BASED ON THE MATCH OF STEP206
208

METHODS AND SYSTEMS FOR CONTEXTUAL APPLICATION ACTION(S) BASED ON PREVIOUS CONTEXT OF ANOTHER APPLICATION

CLAIM OF PRIORITY

This application claims priority to U.S. Patent Application No. 63/321,664, filed on Mar. 19, 2022, and titled METHODS AND SYSTEMS FOR CONTEXTUAL APPLICATION ACTION(S) BASED ON PREVIOUS CONTEXT OF ANOTHER APPLICATION. This provisional application is hereby incorporated by reference in its entirety.

BACKGROUND

A user can often use multiple applications (e.g. mobile phone applications, etc.) to complete a task. For example, if the user would like to schedule a meeting, the user may first interact with other parties via email, then text messages, then use a calendar application to schedule the meeting. However, each time the user switches applications, the user may need to re-input context/content that was already input into the previously used application. For example, the user may need to re-input text relating to setting up the meeting into a texting application that was already provided via email. This information may also need to be then re-input into the calendaring application. According, improvements to maintaining contextual/content data between applications are desired.

CLAIM OF PRIORITY

In one aspect, for each open application, obtain a current application state and an application content; determine one or more relationships between the application state and the application content; use the one or more relationships between the application state and the application content to determine a user intent; for a currently used application, determine a match between an application function and the user intent; and suggest an automatic action for the application function based on the match between an application function and the user intent.

BRIEF DESCRIPTION OF THE DRAWINGS

FIG. 2 illustrates an example process for contextual application action(s) based on previous context of another application, according to some embodiments.

Figure 1:
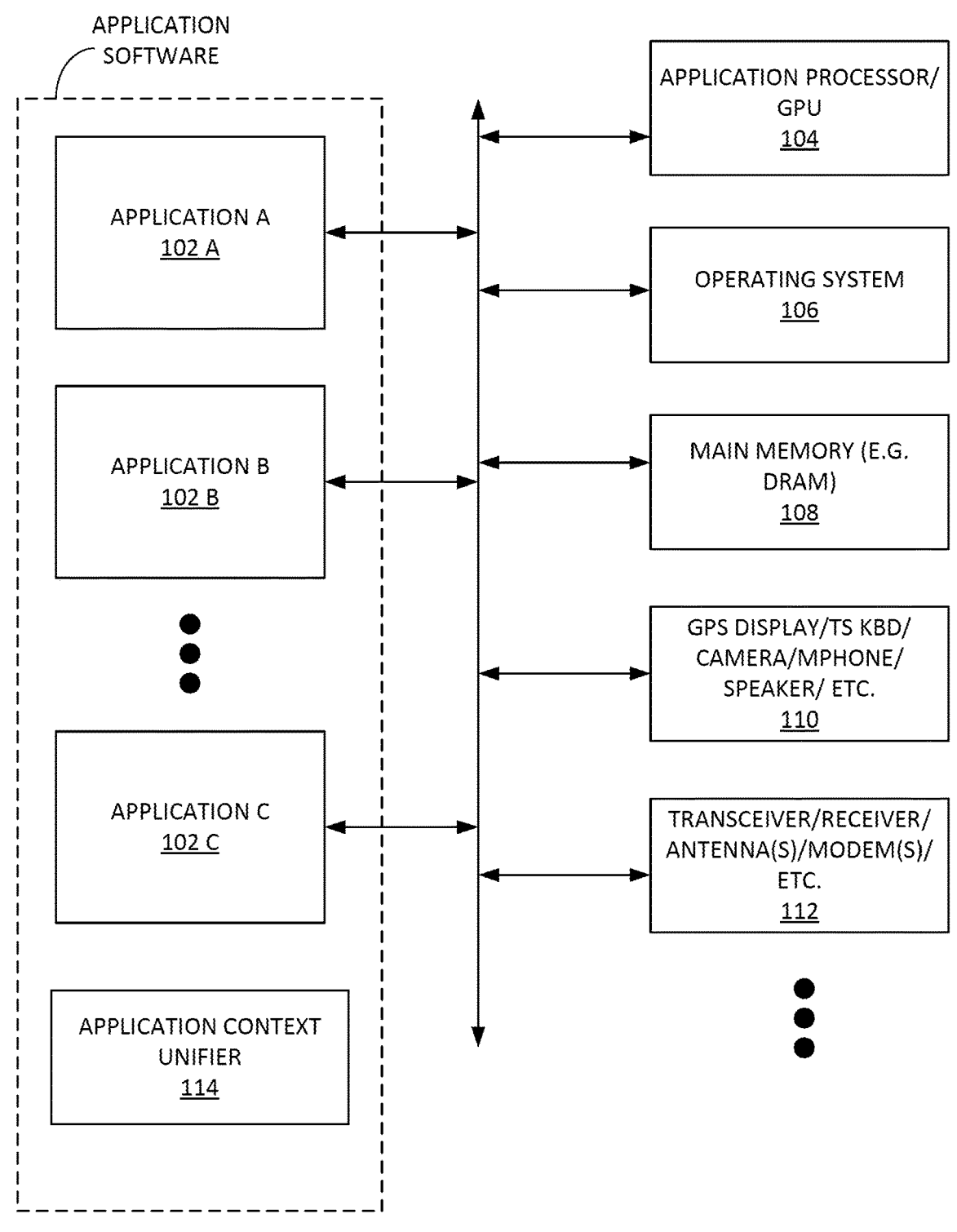
FIG. 1 illustrates an example mobile device system used for contextual application action(s) based on previous context of another application, according to some embodiments.

The Figures described above are a representative set and are not an exhaustive with respect to embodying the invention.

DESCRIPTION

Disclosed are a system, method, and article of manufacture for contextual application action(s) based on previous context of another application. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment, according to some embodiments. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Deep learning is part of a broader family of machine learning methods based on artificial neural networks with representation learning. Learning can be supervised, semi-supervised or unsupervised.

Deep neural network (DNN) is an artificial neural network (ANN) with multiple layers between the input and output layers. There are different types of neural networks but they always consist of the same components: neurons, synapses, weights, biases, and functions.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, logistic regression, and/or sparse dictionary learning. Random forests (RF) (e.g. random decision forests) are an ensemble learning method for classification, regression, and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Messaging application can include a cross-platform centralized instant messaging (IM) and voice-over-IP (VoIP) service.

User interface (UI) is the space where interactions between humans and machines occur. A UI can include a graphical user interface (GUI) as a form of UI that allows users to interact with electronic devices through graphical icons and audio indicator such as primary notation.

Example Systems and Methods

FIG. 1 illustrates an example mobile device system 100 used for contextual application action(s) based on previous context of another application, according to some embodiments. Process 100 can enable a live context sharing between smart devices. Mobile device system 100 can be any portable computing system that utilizes applications. Mobile device system 100 can be a smartphone system, tablet computer system, etc. Mobile device system 100 can include a system-on-chip architecture with various primary components. These can include application processor 104 executing the end-user's application software with assistance from the middleware and operating system (OS) 106. A transceiver/receiver/antenna(s)/modem(s)/etc. 112 and/or baseband processor can be included with its own operating system components responding to the baseband radio activities (e.g. transmission and reception of audio, video, and other data contents). Various peripheral devices for interacting with the end-user (e.g. speakers, microphones, touchscreens, Wi-Fi, BLUETOOTH®, etc.). Mobile device system 100 can include GPS Display/TS KBD/Camera/µphone/Speaker/etc. 110.

Mobile device system 100 can include application software including, inter alia: applications 102 A-N, application context unifier 114, etc. Applications 102 A-N can include audio/video codec and players, games, image processing, speech processing, internet browsing, text editing, etc. Application processor 104 can utilize graphics accelerators when applications 102 A-N are graphics-intensive. Data storage can be volatile SDRAM (1-2 GB) as well as nonvolatile compact storage (10+ GB), DRAM, etc. These can be included in main memory 108.

Application context unifier 114 can manage contextual application action(s) based on previous context of another application (e.g. application 102 A-N, etc.). Applications 102 A-N can computer software designed to help the user to perform specific tasks. Applications 102 A-N can be, inter alia: gaming applications, text messaging applications, email applications, mapping applications, e-commerce applications, etc. Application context unifier 114 can maintain a context/content state between user actions across a plurality of applications. When go from one application to the next, based on most recent activity, application context unifier 114 recommends/bring up context relevant to content available in recent application to new application. For example, if in a text messaging conversation or email application and then the user brings up a calendaring application, application context unifier 114 can determine the relevant content from the text message thread and/or email thread and then automatically determine a set of actions to take in the calendar application. The calendar can recommend the possible event based on the chat content, etc. Application context unifier 114 can retains context memory. It is noted that the current state can be dependent on previous application(s) state.

Application context unifier 114 can periodically obtain a state of each open application. Application context unifier 114 can collate these states and determine a relationship between each of the application states. Application context unifier 114 can use this relationship to determine various automatic actions in a currently open application engaged in by the user. Application context unifier 114 can connect the automatic actions with currently used application functions/actions. Application context unifier 114 can suggest implementation of the automatic actions to the user (e.g. with a dialog window, etc.). For example, as the user navigate a calendar application, Application context unifier 114 can suggest meeting times and participants based on the content of recently used text messaging and email applications.

FIG. 2 illustrates an example process 200 for contextual application action(s) based on previous context of another application, according to some embodiments. In step 202, for each open application, process 200 obtains a current application state and content. In step 204, process 200 determines one or more relationships between the application states and contents to determine a user intent. In step 206, for a currently used application, process 200 determines a match between an application function and a user intent. In step 208, process 200 suggests and/or performs and automatic action for the application function based on the match of step 206.

Example Machine Learning Implementations

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning. Random forests (RF) (e.g. random decision forests) are an ensemble learning method for classification, regression, and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Machine learning can be used to study and construct algorithms that can learn from and make predictions on data. These algorithms can work by making data-driven predictions or decisions, through building a mathematical model from input data. The data used to build the final model usually comes from multiple datasets. In particular, three data sets are commonly used in different stages of the creation of the model. The model is initially fit on a training dataset, that is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consist of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. Finally, the test dataset is a dataset used to provide an unbiased evaluation of a final model fit on the training dataset. If the data in the test dataset has never been used in training (e.g. in cross-validation), the test dataset is also called a holdout dataset.

Additional Example Computer Architecture and Systems

Figure 3:
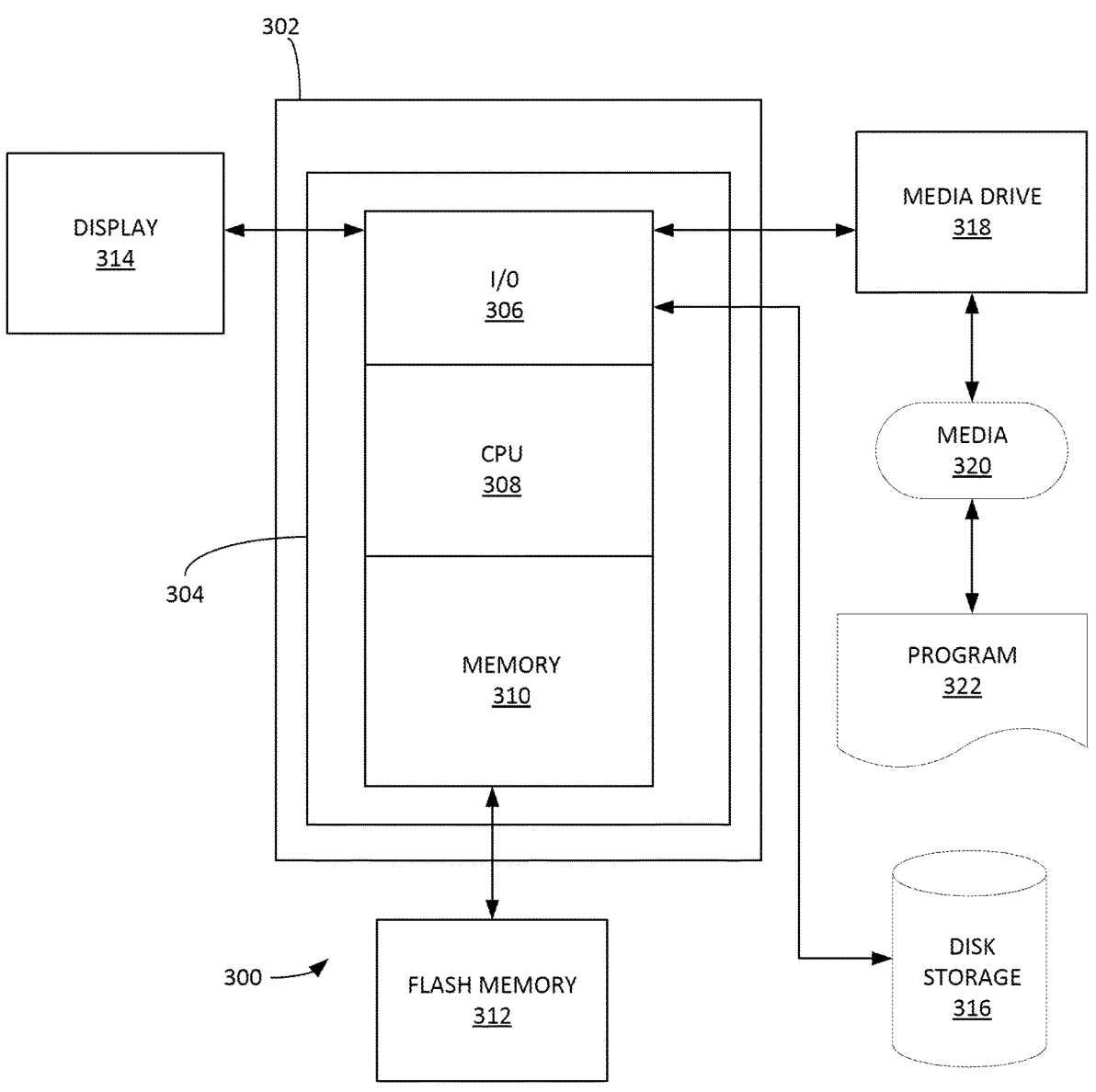
FIG. 3 is a block diagram of a sample computing environment that can be utilized to implement various embodiments.

FIG. 3 depicts an exemplary computing system 300 that can be configured to perform any one of the processes provided herein. In this context, computing system 300 may include, for example, a processor, memory, storage, and I/O devices (e.g., monitor, keyboard, disk drive, Internet connection, etc.). However, computing system 300 may include circuitry or other specialized hardware for carrying out some or all aspects of the processes. In some operational settings, computing system 300 may be configured as a system that includes one or more units, each of which is configured to carry out some aspects of the processes either in software, hardware, or some combination thereof.

FIG. 3 depicts computing system 300 with a number of components that may be used to perform any of the processes described herein. The main system 302 includes a motherboard 304 having an I/O section 306, one or more central processing units (CPU) 308, and a memory section 310, which may have a flash memory card 312 related to it. The I/O section 306 can be connected to a display 314, a keyboard and/or other user input (not shown), a disk storage unit 316, and a media drive unit 318. The media drive unit 318 can read/write a computer-readable medium 320, which can contain programs 322 and/or data. Computing system 300 can include a web browser. Moreover, it is noted that computing system 300 can be configured to include additional systems in order to fulfill various functionalities. Computing system 300 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by United States patent:

1. A computerized method for contextual application actions based on previous context of another application comprising:

for each open application, of a plurality of applications in a plurality of mobile devices obtaining a current application state and an application content;

determining one or more relationships between the application state and the application content;

using the one or more relationships between the application state and the application content to determine a user intent;

for a currently used application, determining a match between an application function and the user intent;

suggesting an automatic action for the application function based on the match between the application function and the user intent;

automatically performing the automatic action for the application function based on the match between the application function and the user intent;

automatically sharing the application state and the application content of each of the open applications between the plurality of mobile devices;

automatically maintain the application state and the application content of each of the open applications between one or more user actions across the plurality of open applications;

automatically persisting the current application state and the current application content in an application-context memory managed by an application context unifier;

automatically synchronizing the persisted application state and the application content across a plurality of heterogeneous applications and device platforms without requiring the user to re-enter contextual data;

wherein the plurality of open applications comprises a first application and a second application, detecting that the user has switched from a first application of the plurality of open applications to a second application of the plurality of open applications; automatically in response to the detecting, re-hydrating the persisted application state of the first application and providing, to the second application, a context relevant to content available in the first application;

executing, by the application context unifier, cross-application synchronization operations that maintain continuity of user intent and actionable content across different operating systems or application sandboxes;

using a most recent user activity within the first application, automatically recommending a context relevant to a content available in the first application to the second application; and determining a relevant content from a text message thread or an email thread and then automatically determining a set of actions to take in a calendar application.

2. The computerized method of claim 1 further comprising:

displaying the context relevant to the content available in the first application to the second application.

3. A computer system useful for contextual application actions based on previous context of another application comprising:

a processor;

a memory containing instructions when executed on the processor, causes the processor to perform operations that:

of a plurality of applications in a plurality of mobile devices for each open application, obtain a current application state and an application content;

determine one or more relationships between the application state and the application content;

use the one or more relationships between the application state and the application content to determine a user intent;

for a currently used application, determine a match between an application function and the user intent;

suggest an automatic action for the application function based on the match between the application function and the user intent;

automatically perform the automatic action for the application function based on the match between an application function and the user intent;

automatically sharing the application state and the application content of each of the open applications between the plurality of mobile devices;

automatically maintain the application state and the application content of each of the open applications between one or more user actions across the plurality of open applications;

automatically persist the current application state and the current application content in an application-context memory managed by an application context unifier;

automatically synchronize the persisted application state and the application content across a plurality of heterogeneous applications and device platforms without requiring the user to re-enter contextual data;

wherein the plurality of open applications comprises a first application and a second application, upon detecting that the user has switched from a first application of the plurality of open applications to a second application of the plurality of open applications, automatically re-hydrate the persisted application state of the first application and providing, to the second application, a context relevant to content available in the first application;

execute, by the application context unifier, cross-application synchronization operations that maintain continuity of user intent and actionable content across different operating systems or application sandboxes;

based on a most recent user activity within the first application, automatically recommending a context relevant to a content available in the first application to the second application; and determining a relevant content from a text message thread or an email thread and then automatically determining a set of actions to take in a calendar application.

4. The computerized system of claim 3, wherein the memory containing instructions when executed on the processor, causes the processor to perform operations that further comprises:

automatically detect that the user has switched from the first application of the plurality of open applications to the second application of the plurality of open applications.

5. The computerized system of claim 4, wherein the memory containing instructions when executed on the processor, causes the processor to perform operations that further comprises:

display the context relevant to the content available in the first application to the second application.

* * * * *